United States Patent [19]

Ravichandran et al.

[11] Patent Number: 4,749,733
[45] Date of Patent: Jun. 7, 1988

[54] SUBSTITUTED HYDROXYLAMINES AND COMPOSITIONS STABILIZED THEREWITH

[75] Inventors: Ramanathan Ravichandran, Yonkers; Raymond Seltzer, New City, both of N.Y.

[73] Assignee: Ciba-Geigy Corporation, Ardsley, N.Y.

[21] Appl. No.: 940,834

[22] Filed: Dec. 12, 1986

[51] Int. Cl.$^4$ ............................................... C08K 7/32
[52] U.S. Cl. ...................... 524/101; 524/239; 524/244; 524/245; 524/249; 524/250
[58] Field of Search ............... 524/101, 244, 239, 245, 524/249, 250

[56] References Cited

U.S. PATENT DOCUMENTS

| | | | |
|---|---|---|---|
| 3,275,592 | 9/1966 | Oswald et al. | 524/236 |
| 3,432,578 | 3/1969 | Martin | 525/314 |
| 3,644,278 | 2/1973 | Klemchuk | 524/236 |
| 3,778,464 | 12/1973 | Klemchuk | 524/236 |
| 3,926,909 | 12/1975 | Wei | 524/217 |
| 4,316,996 | 2/1982 | Collonge et al. | 568/784 |
| 4,386,224 | 5/1983 | Deetman | 568/703 |
| 4,590,231 | 5/1986 | Seltzer et al. | 524/236 |

OTHER PUBLICATIONS

Jordan et al: J.C.S. PTI 1, 928–933 (1978).
Zhang et al: J. Med. Chem. 26 455–458 (1983).

*Primary Examiner*—Veronica P. Hoke
*Attorney, Agent, or Firm*—Harry Falber

[57] ABSTRACT

Compounds of the formulae

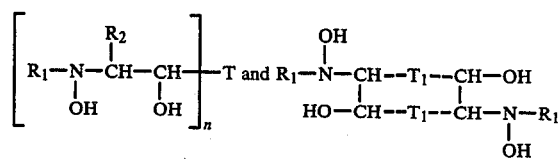

are useful stabilizers of organic polymeric materials which are subject to thermal, oxidative and/or actinic degradation.

17 Claims, No Drawings

SUBSTITUTED HYDROXYLAMINES AND COMPOSITIONS STABILIZED THEREWITH

The present invention relates to novel substituted hydroxylamines and compositions stabilized therewith.

Organic polymeric materials such as plastics and resins are subject to thermal, oxidative and photodegradation. A great variety of stabilizers are known in the art for stabilizing a diversity of substrates. Their effectiveness varies depending upon the causes of degradation and the substrate stabilized. In general, it is difficult to predict which stabilizer will be most effective and most economical for any one area of application. For example, stabilizer effectiveness in reducing volatility may depend upon preventing bond scission in the substrate molecule. Limiting embrittlement and retaining elasticity in a polymer or rubber may require prevention of excessive crosslinking and/or chain scission. Prevention of discoloration may require inhibiting reactions which yield new chromophores or color bodies in the substrate or stabilizer. Problems of process stability and incompatibility must also be considered.

Various organic hydroxylamine compounds are generally known and some are commercially available. A number of patents disclose nitrogen-substituted hydroxylamines as antioxidant stabilizers for various substrates including polyolefins, polyesters and polyurethanes. U.S. Pat. Nos. 3,432,578, 3,644,278, 3,778,464, 3,408,422, 3,926,909, 4,316,996, 4,386,224 and 4,590,231 are representative of such patents which basically disclose N,N-dialkyl-, N,N-diaryl and N,N-diaralkyl hydroxylamine compounds and their color improvement and color stabilizing activity.

In addition, various hydroxylamine-epoxide adducts are described in the literature. For example, various β-hydroxypropylhydroxyamino aryl ethers are disclosed in Malinovskii et al, Zhurnal Organish. Khimii, 1, 1365–1367 (1965). Zhang et al, J. Med. Chem., 26, 455–458 (1983) report on the synthesis of 1—$C_{10}$-$H_7$—$OCH_2CH(OH)CH_2N(OH)CH(CH_3)_2$. Jordan et al, J. C. S. PTI 1, 928-33 (1978) describe various $ArOCH_2CH(OH)CH_2N(OH)CH(CH_3)_2$ compounds. Polymer stabilization utilizing these compounds is not indicated in these publications.

It has now been determined that the compositions of this invention exhibit a variety of desirable properties stemming from the presence therein of the indicated hydroxylamine compounds. These compounds represent adducts of substituted hydroxylamines with suitable epoxides.

Thus, these compounds serve to protect various substrates such as polyolefins, elastomers and lubricating oils against the adverse effects of oxidative and/or thermal degradation. They are most effective as color improvers and process stabilizers in polyolefin compositions which may contain metal salts of fatty acids and which also contain a phenolic antioxidant. Thus, they serve to substantially reduce color formation resulting from the presence of the phenolic antioxidant and/or from the processing conditions as well as directly protect the polymer from said processing conditions. They also prevent the discoloration of polyolefin compositions containing hindered amine light stabilizers or combinations containing hindered amine light stabilizers or combinations of phenolic antioxidants and organic phosphites. In addition, the gas fading that may be experienced upon exposure to the combustion products of natural gas is also significantly reduced.

It is the primary object of this invention to provide a specific class of novel hydroxylamine derivatives which exhibits a broad range of improved stabilization performance characteristics.

It is a further object of this invention to provide compositions of organic materials stabilized against oxidative, thermal and/or actinic degradation by the presence therein of said class of hydroxylamine derivatives.

It is still a further object to provide such compositions which also contain phenolic antioxidants wherein said hydroxylamine derivatives substantially reduce color formation resulting from the presence of said phenol.

Various other objects and advantages of this invention will become evident from the following description thereof.

Thus, according to the present invention there are provided novel compounds of the formula $$\left[ R_1 - \underset{\underset{OH}{|}}{N} - \underset{\underset{OH}{|}}{CH} - \underset{}{CH} \right]_n T$$

wherein
$R_1$ is alkyl having 1 to 36 carbon atoms, cycloalkyl having 5 to 12 carbon atoms, phenyl or naphthyl which is unsubstituted or substituted by alkyl of 1 to 36 carbon atoms or aralkyl having 7 to 9 carbon atoms which is unsubstituted or substituted by alkyl having 1 to 36 carbon atoms,
$R_2$ is hydrogen or $R_1$,
n is 1 to 4, and
when n is 1, T is $R_1$ or

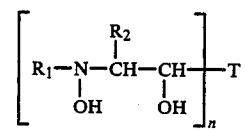

or T and $R_2$ together with the carbon atoms to which they are attached form a ring containing 5 to 12 carbon atoms;
when n is 2, T is alkylene having 2 to 12 carbon atoms or

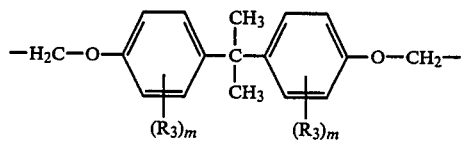

wherein m is 1 or 2 and $R_3$ is hydrogen, alkyl or alkoxy each having 1 to 4 carbon atoms, hydroxyl, halogen, cyano or nitro or

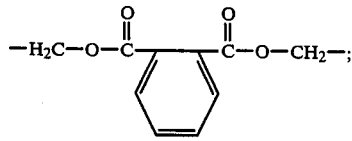

when n is 3, T is

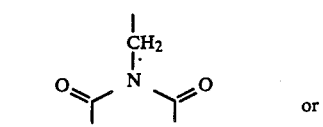 or

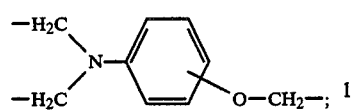

and, when n is 4, T is

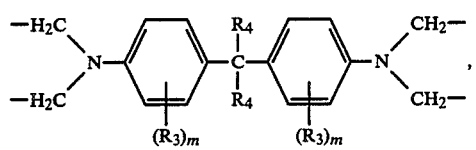

wherein R$_4$ is hydrogen or methyl and R$_3$ and m are as previously defined.

Suitable alkyl radicals for R$_1$ and R$_2$ are, for example, methyl, ethyl, propyl, butyl, pentyl, hexyl, octyl, decyl, tetradecyl, hexadecyl, eicosyl, docosyl, pentacosyl, heptacosyl, triacontyl, dotriacontyl, tetratriacontyl and hexatriacontyl as well as branched isomers thereof.

As cycloalkyl, R$_1$ and R$_2$ are, for example, cyclopentyl, cyclohexyl, cycloheptyl, cyclooctyl, cyclodecyl and cyclododecyl.

R$_1$ and R$_2$ as aralkyl having 7 to 9 carbon atoms include benzyl, phenylethyl or phenylpropyl.

When n denotes 1 and T and R$_2$ together with the carbon atoms to which they are attached form a ring containing 5 to 12 carbon atoms, the ring is a saturated carbocyclic ring and thus includes cyclopentyl, cyclohexyl, cyclooctyl, cyclononyl or cyclododecyl.

When n is 2, T as alkylene having 2 to 12 carbon atoms includes ethylene, propylene, butylene, hexylene, octylene, nonylene, decylene, dodecylene or branched isomers thereof.

When n is 3, and T is an ether radical of the formula

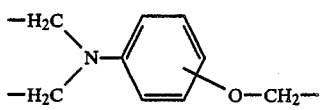

the —O—CH$_2$— group preferably occupies the para-position to the —N(CH$_2$—)$_2$— substituent on the phenyl ring.

When n is 4 and T represents a radical of the formula

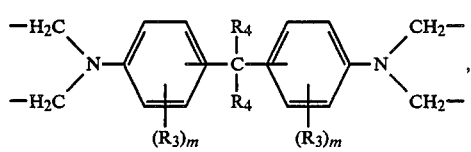

the —C(R$_4$)$_2$— moiety is preferably attached in para-position to each —N(CH$_2$—)$_2$ substituent on the phenyl ring.

In the preferred compounds, R$_1$ is alkyl having 1 to 18 carbon atoms, cycloalkyl having 5 to 8 carbon atoms, phenyl, benzyl or phenylethyl, R$_2$ is hydrogen, n is 1 to 4, and, when n is 1, T is R$_1$ or —CH$_2$—O—C$_6$H$_5$, when n is 2, T is alkylene having 2 to 5 carbon atoms or

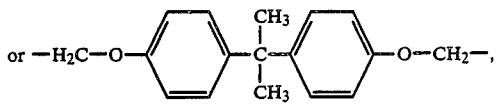

when n is 3, T is

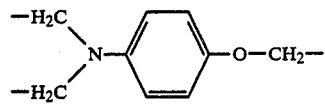

and when n is 4, T is

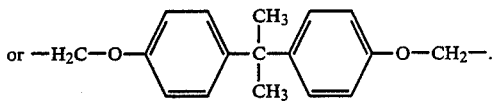

where R$_4$ is as defined.

More preferably, R$_1$ is alkyl having 3 to 6 or 8 to 18 carbon atoms, cyclohexyl, cyclooctyl, phenyl or benzyl and n is 1 or 2, and, when n is 1, T is R$_1$ or —CH$_2$O—C$_6$H$_5$ and when n is 2, T is alkylene having 2 or 3 carbon atoms or

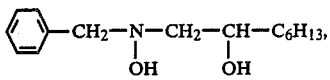

Typical compounds correspond to the formulae

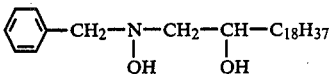

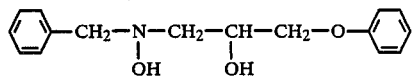

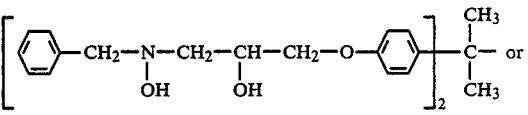

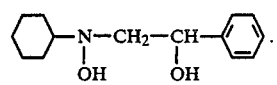

Additional compounds within the invention correspond to

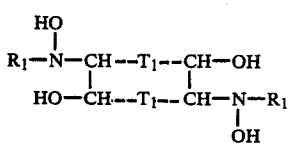 (II)

wherein $R_1$ is as previously defined and $T_1$ represents the carbon atoms necessary to complete a 6- to 12-membered ring. Preferably, this ring is a saturated carbocyclic ring and includes, for example, cyclohexyl, cyclooctyl, cyclononyl, cyclodecyl or cyclododecyl.

Preferred compounds of the formula (II) are those wherein $R_1$ is alkyl having 1 to 12 carbon atoms, cycloalkyl having 5 to 8 carbon atoms, benzyl or phenylethyl and T represents the carbon atoms required to complete a 6- or 8-membered ring.

The compound of the formula

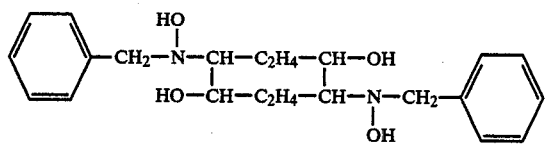

is mostly preferred.

The compounds of formula (I) can be prepared using reaction principles generally known in the art. For example, a hydroxylamine of the formula

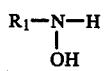

can be reacted with an epoxide of the formula

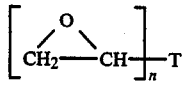

in a polar organic solvent in a temperature range of from 25° to 100° C., preferably at room temperature, and under an inert gas, preferably a nitrogen atmosphere, to yield the compounds of the formula (I).

Suitable polar organic solvents include alcohols, ethers and ketones or mixtures thereof, with lower alcohols such as ethanol, N-propanol, i-propanol, N-butanol and i-butanol being preferred. However, other solvents which do not interfere with the reaction are also applicable.

The preparation of the compounds of formula (II) can be conducted under the same conditions. Thus, the appropriately substituted hydroxylamine is reacted with an epoxide of the formula

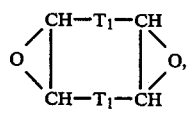

wherein $T_1$ is as defined, in the above-described manner.

It has also been found that in addition to the novel compounds of the formula (I) wherein T is

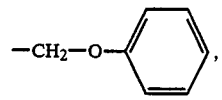

corresponding compounds with

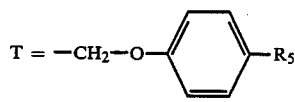

where in $R_5$ is, for example, alkyl or alkoxy each having 1 to 4 carbon atoms, hydroxyl, halogen, cyano or nitro, also provide effective stabilizing activity. These latter compounds are partially known. For example, Jordan et al noted hereinabove describe the preparation of

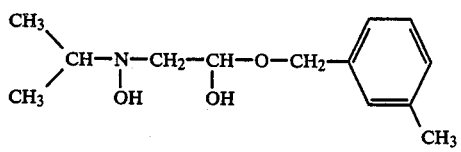

in connection with pharmaceutical investigations. Thus, compositions according to the present invention contain compounds of the formula

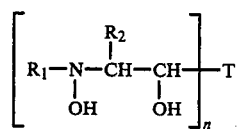

wherein the definitions are identical to those of formula I and, in addition, when n is 1, T can also be

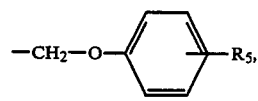

where $R_5$ is hydrogen, alkyl or alkoxy each having 1 to 4 carbon atoms, hydroxyl, halogen, cyano or nitro. Corresponding definitions likewise apply to compounds of formula (II).

It is also to be noted that the invention is deemed to include polymeric analogs of the indicated compounds derived from a difunctional epoxide and a monofunctional or difunctional hydroxylamine.

The compounds are particularly effective in stabilizing organic materials such as plastics, polymers and resins in addition to mineral and synthetic fluids such as lubricating oils, circulating oils, etc.

Substrates in which the compounds are particularly useful are polyolefins such as polyethylene and polypropylene, polystyrene, including impact polystyrene, ABS resin, SBR, isoprene, as well as natural rubber, polyesters including polyethylene terephthalate and polybutylene terephthalate, including copolymers and lubricating oils such as those derived from mineral oil.

In general, polymers which can be stabilized include:
1. Polymers of monoolefins and diolefins, for example polyethylene (which optionally can be crosslinked), polypropylene, polyisobutylene, polybutene-1, polymethylpentene-1, polyisoprene or polybutadiene, as well as polymers of cycloolefins, for instance of cyclopentene or norbornene.

2. Mixtures of the polymers mentioned under 1), for example mixtures of polypropylene with polyisobutylene.

3. Copolymers of monoolefins and diolefins with each other or with other vinyl monomers, such as, for example, ethylene/propylene, propylene/butene-1, propylene/isobutylene, ethylene/butene-1, propylene/butadiene, isobutylene/isoprene, ethylene/alkyl acrylates, ethylene/alkyl methacrylates, ethylene/vinyl acetate or ethylene/acrylic acid copolymers and their salts (ionomers) and terpolymers of ethylene with propylene and a diene, such as hexadiene, dicyclopentadiene or ethylidene-norbornene.

4. Polystyrene, poly-(p-methylstyrene).

5. Copolymers of styrene or methylstyrene with dienes or acrylic derivatives, such as, for example, styrene/butadiene, styrene/acrylonitrile, styrene/ethyl methacrylate, styrene/butadiene/ethyl acrylate, styrene/acrylonitrile/methyl acrylate; mixtures of high impact strength from styrene copolymers and another polymer, such as, for example, from a polyacrylate, a diene polymer or an ethylene/propylene/diene terpolymer; and block polymers of styrene, such as, for example, styrene/butadiene/styrene, styrene/isoprene/styrene, styrene/ethylene/butylene/styrene or styrene/ethylene/propylene/styrene.

6. Graft copolymers of styrene, such as, for example, styrene on polybutadiene, styrene and acrylonitrile on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed under 5), for instance the copolymer mixtures known as ABS-, MBS-, ASA- or AES-polymers.

7. Halogen-containing polymers, such as polychloroprene, chlorinated rubbers, chlorinated or sulfo-chlorinated polyethylene, epichlorohydrin homo- and copolymers, polymers from halogen-containing vinyl compounds, as for example, polyvinylchloride, polyvinylidene chloride, polyvinyl fluoride, polyvinylidene fluoride, as well as copolymers thereof, as for example, vinyl chloride/vinylidene chloride, vinyl chloride/vinyl acetate or vinylidene chloride/vinyl acetate copolymers.

8. Polymers which are derived from $\alpha,\beta$-unsaturated acids and derivatives thereof, such as polyacrylates and polymethacrylates, polyacrylamide and polyacrylonitrile.

9. Copolymers from the monomers mentioned under 8) with each other or with other unsaturated monomers, such as, for instance, acrylonitrile/butadiene, acrylonitrile/alkyl acrylate, acrylonitrile/alkoxyalkyl acrylate or acrylonitrile/vinyl halogenide copolymers or acrylonitrile/alkyl methacrylate/butadiene terpolymers.

10. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinylbutyral, polyallyl phthalate or polyallyl-melamine.

11. Homopolymers and copolymers of cyclic ethers, such as polyalkylene glycols, polyethylene oxide, polypropylene oxide or copolymers thereof with bis-glycidyl ethers.

12. Polyacetals, such as polyoxymethylene and those polyoxymethylenes which contain ethylene oxide as comonomer.

13. Polyphenylene oxides and sulfides, and mixtures of polyphenylene oxides with polystyrene.

14. Polyurethanes which are derived from polyethers, polyesters or polybutadienes with terminal hydroxyl groups on the one side and aliphatic or aromatic polyisocyanates on the other side, as well as precursors thereof (polyisocyanates, polyols or prepolymers).

15. Polyamides and copolyamides which are derived from diamines and dicarboxylic acids and/or from aminocarboxylic acids or the corresponding lactams, such as polyamide 4, polyamide 6, polyamide 6/6, polyamide 6/10, polyamide 11, polyamide 12, poly-2,4,4-trimethylhexamethylene terephthalamide or poly-m-phenylene isophthalamide, as well as copolymers thereof with polyethers, such as for instance with polyethylene glycol, polypropylene glycol or polytetramethylene glycols.

16. Polyureas, polyimides and polyamide-imides.

17. Polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-[2,2-(4-hydroxyphenyl)-propane] terephthalate and polyhydroxybenzoates as well as block-copolyether-esters derived from polyethers having hydroxyl end groups.

18. Polycarbonates.

19. Polysulfones, polyethersulfones and polyetherketones.

20. Crosslinked polymers which are derived from aldehydes on the one hand and phenols, ureas and melamines on the other hand, such as phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low flammability.

23. Thermosetting acrylic resins, derived from substituted acrylic esters, such as epoxy-acrylates, urethane-acrylates or polyester acrylates.

24. Alkyd resins, polyester resins or acrylate resins in admixture with melamine resins, urea resins, polyisocyanates or epoxide resins as crosslinking agents.

25. Crosslinked epoxide resins which are derived from polyepoxides, for example from bis-glycidyl ethers or from cycloaliphatic diepoxides.

26. Natural polymers, such as cellulose, rubber, gelatin and derivatives thereof which are chemically modified in a polymer homologous manner, such as cellulose acetates, cellulose propionates and cellulose butyrates, or the cellulose ethers, such as methylcellulose.

27. Mixtures of polymers as mentioned above, for example PP/EPDM, Polyamide 6/EPDM or ABS,

PVC/EVA, PVC/ABS, PVC/MBS, PC/ABS, PBTP/ABS.

28. Naturally occuring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, which materials may be used as plasticizers for polymers or as textile spinning oils, as well as aqueous emulsions of such materials.

29. Aqueous emulsions of natural or synthetic rubber, e.g. natural latex or latices of carboxylated styrene/butadiene copolymers.

In general, the compounds of the present invention are employed in from about 0.01 to about 5% by weight of the stabilized composition, although this will vary with the particular substrate and application. An advantageous range is from about 0.5 to about 2%, and especially 0.1 to about 1%.

The stabilizers of the instant invention may readily be incorporated into the organic polymers by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized polymer compositions of the invention may optionally also contain various conventional additives, such as the following.

1. Antioxidants
  1.1. Alkylated monophenols, for example,
2,6-di-tert.butyl-4-methylphenol
2-tert.butyl-4,6-dimethylphenol
2,6-di-tert.butyl-4-ethylphenol
2,6-di-tert.butyl-4-n-butylphenol
2,6-di-tert.butyl-4-i-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert.butyl-4-methoxymethylphenol
  1.2. Alkylated hydroquinones, for example,
2,6-di-tert.butyl-4-methoxyphenol
2,5-di-tert.butyl-hydroquinone
2,5-di-tert.amyl-hydroquinone
2,6-diphenyl-4-octadecyloxyphenol
  1.3. Hydroxylated thiodiphenyl ethers, for example
2,2'-thio-bis-(6-tert.butyl-4-methylphenol)
2,2'-thio-bis-(4-octylphenol)
4,4'-thio-bis-(6-tert.butyl-3-methylphenol)
4,4'-thio-bis-(6-tert.butyl-2-methylphenol)
  1.4. Alkylidene-bisphenols, for example,
2,2'-methylene-bis-(6-tert.butyl-4-methylphenol)
2,2'-methylene-bis-(6-tert.butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert.butylphenol)
2,2'-ethylidene-bis-(4,6-di-tert.butylphenol)
2,2'-ethylidene-bis-(6-tert.butyl-4-isobutylphenol)
4,4'-methylene-bis-(2,6-di-tert.butylphenol)
4,4'-methylene-bis-(6-tert.butyl-2-methylphenol)
1,1-bis-(5-tert.butyl-4-hydroxy-2-methylphenyl-butane
2,6-di-(3-tert.butyl-5-methyl-2-hydroxybenzyl)-4-methylphenol
1,1,3-tris-(5-tert.butyl-4-hydroxy-2-methylphenyl)-butane
1,1-bis-(5-tert.butyl-4-hydroxy-2-methylphenyl)-3-n-dodecylmercaptobutane
ethylenglycol-bis-[3,3-bis-(3'-tert.butyl-4'-hydroxyphenyl)-butyrate]
di-(3-tert.butyl-4-hydroxy-5-methylphenyl)-dicyclopentadiene
di-[2-(3'-tert.butyl-2'-hydroxy-5'-methyl-benzyl)-6-tert.butyl-4-methylphenyl]-terephthalate.
  1.5. Benzyl compounds, for example,
1,3,5-tri-(3,5-di-tert.butyl-4-hydroxybenzyl)-2,4,6-trimethylbenzene-di-(3,5-di-tert.butyl-4-hydroxybenzyl)- sulfide
3,5-di-tert.butyl-4-hydroxybenzyl-mercapto-acetic acid isooctyl ester
bis-(4-tert.butyl-3-hydroxy-2,6-dimethylbenzyl)dithiol-terephthalate
1,3,5-tris-(3,5-di-tert.butyl-4-hydroxybenzyl)-isocyanurate
1,3,5-tris-(4-tert.butyl-3-hydroxy-2,6-dimethylbenzyl)isocyanurate
3,5-di-tert.butyl-4-hydroxybenzyl-phosphoric acid-dioctadecyl ester
3,5-di-tert.butyl-4-hydroxybenzyl-phosphoric acid-monoethyl ester, calcium-salt
  1.6. Acylaminophenols, for example,
4-hydroxy-lauric acid anilide
4-hydroxy-stearic acid anilide
2,4-bis-octylmercapto-6-(3,5-tert.butyl-4-hydroxyanilino)s-triazine
octyl-N-(3,5-di-tert.butyl-4-hydroxyphenyl)-carbamate
  1.7. Esters of β-(3,5-di-tert-butyl-4-hydroxyphenyl)-propionic acid
with monohydric or polyhydric alcohols, for example,

| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.8. Esters of β-(5-tert-butyl-4-hydroxy-3-methylphenyl)propionic acid
with monohydric or polyhydric alcohols, for example,

| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.9. Amides of β-(3,5-di-tert.butyl-4-hydroxyphenyl)-propionic acid
for example,
N,N'-di-(3,5-di-tert.butyl-4-hydroxyphenylpropionyl)-hexamethylenediamine
N,N'-di-(3,5-di-tert.butyl-4-hydroxyphenylpropionyl) trimethylenediamine
N,N'-di-(3,5-di-tert.butyl-4-hydroxyphenylpropionyl)-hydrazine 2. UV absorbers and light stabilizers
  2.1. 2'-(b 2'-Hydroxyphenyl)-benzotriazoles, for example, the 5'-methyl-, 3',5'-di-tert.butyl-, 5'-tert.butyl-, 5'-(1,1,3,3-tetramethylbutyl)-, 5-chloro-3 ', 5'-di-tert.butyl-, 5-chloro-3'-tert.butyl-5'-methyl-, 3'-sec.butyl-5'-tert.butyl-, 4'-octoxy, 3 ', 5'-di-tert.amyl-, 3', 5'-bis( α,α-dimethylbenzyl)-derivative.

2.2. 2-Hydroxy-benzophenones,
for example, the 4-hydroxy-, 4-methoxy-, 4-octoxy, 4-decyloxy-, 4-dodecyloxy-, 4-benzyloxy, 4,2 ', 4'-trihydroxy- and 2'-hydroxy-4,4'-dimethoxy derivative.

2.3. Esters of optionally substituted benzoic acids
for example, phenyl salicylate, 4-tert.butyl-phenylsalicylate, octylphenyl salicylate, dibenzoylresorcinol, bis-(4-tert.butylbenzoy)-resorcinol, benzoylresorcinol, 3,5-di-tert.butyl-4-hydroxybenzoic acid 2,4-di-tert.butylphenyl ester and 3,5-di-tert.-butyl-4-hydroxybenzoic acid hexadecyl ester.

2.4. Acrylates,
for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyano-vinyl)-2-methyl-indoline.

2.5 Nickel compounds,
for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert.butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazole, optionally with additional ligands.

2.6. Sterically hindered amines,
for example bis-(2,2,6,6-tetramethylpiperidyl)-sebacate, bis-(1,2,2,6,6-pentamethylpiperidyl)-sebacate, n-butyl-3,5-di-tert.butyl-4-hydroxybenzyl malonic acid bis-(1,2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylenediamine and 4-tert.octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butanetetracarbonic acid, 1,1'(1,2-ethanediyl)-bis-(3,3,5,5-tetramethylpiperazinone).

2.7 Oxalic acid diamides,
for example, 4,4'-di-octyloxyoxanilide, 2,2'-di-octyloxy-5,5'-di-tert.butyl-oxanilide, 2,2'-di-dodecyloxy-5,5'-di-tert.butyl-oxanilide, 2-ethoxy-2'-ethyl-oxanilide, N,N'-bis (3-dimethylaminopropyl)oxalamide, 2-ethoxy-5-tert.butyl-2'-ethyloxanilide and its mixture with 2-ethoxy-2'-ethyl-5,4'-di-tert.butyloxanilide and mixtures of ortho- and para-methoxy- as well as of o- and p-ethoxy-disubstituted oxanilides.

3. Metal deactivators,
for example, N,N'-diphenyloxalic acid diamide, N-salicylal-N'-salicyloylhydrazine, N,N'-bis-salicyloylhydrazine, N,N'-bis-(3,5-di-tert.butyl-4-hydroxyphenylpropionyl)-hydrazine, 3-salicyloylamino-1,2,4-triazole, bis-benzylidene-oxalic acid dihydrazide.

4. Phosphites and phosphonites,
for example, triphenyl phosphite, diphenylalkyl phosphates, phenyldialkyl phosphites, tri-(nonylphenyl)-phosphite, trilauryl phosphite, trioctadecyl phosphite, di-stearyl-pentaerythritol diphosphite, tris-(2,4-di-tert.butylphenyl) phosphite, di-isodecylpentaerythritol diphosphite, di-(2,4-di-tert.butylphenyl) pentaerythritol diphosphite, tristearylsorbitol triphosphite, tetrakis-(2,4-di-tert.butylphenyl)-4,4'-diphenylylenediphosphonite.

5. Compounds which destroy peroxide,
for example, esters of β-thiodipropionic acid, for example the lauryl, stearyl, myristyl or tridecyl esters, mercapto-benzimidazole or the zinc salt of 2-mercaptobenzimidazole, zinc-dibutyl-dithiocarbamate, dioctadecyl-disulfide, pentaerythritol-tetrakis-(β-dodecylmercapto)-propionate.

6. Polyamide stabilizers,
for example copper salts in combination with iodides and/or phosphorus compounds and salts of divalent manganese.

7. Basic co-stabilizers,
for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

8. Nucleating agents,
for example, 4-tert.butyl-benzoic acid, adipic acid, diphenylacetic acid.

9. Fillers and reinforcing agents,
for example, calcium carbonate, silicates, glass fibers, asbestos, talc, kaolin, mica, barium sulfate, metal oxides and hydroxides, carbon black, graphite.

10. Other additives,
for example, plasticizers, lubricants, emulsifiers, pigments, optical brighteners, flameproofing agents, antistatic agents, blowing agents and thiosynergists such as dilaurylthiodipropionate or distearylthiodipropionate.

While the instant compounds can be beneficially used as stabilizers for a variety of substrates, particularly the polyolefins, both alone and in conjunction with other coadditives, the introduction of the instant compounds into polyolefins, optionally containing various alkali metal, alkaline earth metal and aluminum salts of higher fatty acids (see Additive #7 hereinabove), with hindered phenolic antioxidants results in enhanced and particularly salubrious protection to such substrates in terms of reducing color formation stemming from the presence of the phenols. Such phenolic antioxidants include n-octadecyl 3,5-di-tert-butyl-4-hydroxyhydrocinnamate, neopentanetetrayl tetrakis-(3,5-di-tert-butyl-4-hydroxyl-hydrocinnamate), di-n-octadecyl 3,5-di-tertbutyl-4-hydroxybenzyl-phosphonate, 1,3,5-tris(3,5-di-tert-butyl-4-hydroxy-benzyl)isocyanurate, thiodiethylene bis(3,5-di-tert-butyl-4-hydroxyhydrocinnamate), 1,3,5-trimethyl-2,4,6-tris (3,5-di-tert-butyl-4-hydroxybenzyl)benzene, 3,6-di-oxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-di-methyl-4-tert-butyl-3-hydroxybenzyl)isocyanurate, 1,1,3-tris-(2-methyl-4-hydroxy-5-tert-butylphenyl)butane, 1,3,5-tris-[2-(3,5-di-tert-butyl-4-hydroxy-hydrocinnamoyloxy)-ethyl]-isocyanurate, 3,5-di-(3,5-di-tert-butyl-4-hydroxybenzyl)-mesitol, hexamethylene bis(3,5-di-tert-butyl-4-hydroxyhydrocinnamate), 1-(3,5-di-tert-butyl- 4-hydroxyanilino)-3,5-di(octylthio)-s-triazine, N,N'-hexamethylene-bis(3,5-di-tert-butyl-4-hydroxyhydrocinnamamide), calcium bis(ethyl-3,5-di-tert-butyl-4-hydroxybenzylphosphonate), ethylene bis[3,3-di(3-tertbutyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis[2-(3,5-tert-butyl-4-hydroxyhydroxo-cinnamoyloxy)ethyl]-oxamide, and preferably neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris-(3,5-di-tert-butyl-4-hydroxybenzyl)isocyanurate, 2,6-di-tert-butyl-p-cresol or 2,2'-ethylidene-bis(4,6-di-tert-butylphenol).

Likewise, the instant compounds prevent color formation when hindered amine light stabilizers are present, such hindered amines including bis(1,2,2,6,6-pentamethyl-4-piperidyl)-2-n-butyl-2-(3,5-di-tert-butyl-4-hydroxybenzyl) malonate; bis(2,2,6,6-tetramethyl-4-piperidyl) sebacate; dimethylsuccinate polymer with 4-hydroxy-2,2,6,6-tetramethyl-1-piperidinethanol; and polymer of 2,4-dichloro-6-octylamino-s-triazine with N'-(2,2,6,6-tetramethyl-4-piperidyl)hexamethylene diamine.

The following examples illustrate preferred specific embodiments of the instant invention.

EXAMPLE 1

2,2-[4,4'-bis[3-(N-benzyl-N-hydroxyamino)-2-hydroxypropyloxy)]phenyl]propane

A solution of 6.0 g of Bisphenol A diglycidylether and 4.43 g of N-benzylhydroxylamine in 20 ml of isopropanol is stirred at room temperature overnight under a nitrogen atmosphere. The reaction mixture is then concentrated under reduced pressure and the residue is purified by liquid chromatography to afford the compound in 57% yield as a white solid having a melting point of 131° to 136° C.

Anal. Calcd. for $C_{35}H_{42}N_2O_6$: C, 71.7; H, 7.2; N, 4.8. Found: C, 71.5; H, 7.3; N, 4.6.

EXAMPLE 2

N-benzyl-N-(2-hydroxy-3-phenoxypropyl)hydroxylamine

The procedure of Example 1 is repeated using 3.5 g of N-benzylhydroxylamine and 6.16 g of phenylglycidyl ether in 50 ml of isopropanol. Purification by liquid chromatography affords the title compound in 35% yield as a colorless oil.

Anal. Calcd. for $C_{16}H_{19}NO_3$: C, 70.3; H, 7.0; N, 5.1. Found: C, 70.6, H, 6.8; N, 5.0.

EXAMPLE 3

N-benzyl-N-(2-hydroxyoctyl)hydroxylamine

The procedure of Example 1 is repeated using 5.0 g of N-benzylhydroxylamine and 5.26 g octene-1-oxide in 20 ml of isopropanol. Purification by liquid chromatography affords the title compound in a 38% yield as a colorless oil.

Anal. Calcd. for $C_{15}H_{25}NO_2$: C, 71.7; H, 10.0; N, 5.6. Found: C, 72.0; H, 10.0; N, 5.4.

EXAMPLE 4

N-cyclohexyl-N-[2-hydroxyphenethyl]hydroxylamine

A solution of 2.14 g of N-cyclohexylhydroxylamine and 2.23 of styrene oxide in 50 ml of isopropanol is heated at 45° C. for 3 hours and under reflux for 20 hours. The reaction mixture is concentrated under reduced pressure and the residue is purified by liquid chromatography to afford the title compound in a 33% yield as a yellow oil.

Anal. Calcd. for $C_{14}H_{21}NO_2$: C, 71.5; H, 9.0; N, 6.0. Found: C, 71.7; H, 8.6; N, 6.0.

EXAMPLE 5

This example illustrates the thermal stabilizing effectiveness of the instant stabilizers in combination with a phenolic antioxidant in polypropylene.

| Base Formulation | |
|---|---|
| Polypropylene* | 100 parts by weight |
| Calcium Stearate | 0.10 part by weight |

*Profax 6501 from Himont U.S.A.

Stabilizers are solvent blended into polypropylene as solutions in methylene chloride and after removal of solvent by evaporation at reduced pressure, the resin is extruded using the following extruder conditions:

| | Temperature (°C.) |
|---|---|
| Cylinder #1 | 232 |
| Cylinder #2 | 246 |
| Cylinder #3 | 260 |
| Gate #1 | 260 |
| Gate #2 | 260 |
| Gate #3 | 260 |
| RPM | 100 |

The melt flow rate (MFR) is determined by ASTM method 1238, condition L. The melt flow rate is a measure of the molecular wieght for a specific type of polymer.

| Additives | MFR After Extrusion (g/10 Min) | |
|---|---|---|
| | 1 | 5 |
| Base Resin | 5.7 | 11.4 |
| 0.1% Antioxidant A | 4.5 | 6.2 |
| 0.1% Antioxidant A + 0.05% of the compound of Example 1 | 2.4 | 3.6 |
| 0.1% Antioxidant A + 0.05% of the compound of Example 2 | 2.4 | 3.0 |
| 0.1% Antioxidant A + 0.05% of the compound of Example 3 | 2.3 | 3.1 |

Antioxidant A is neopentyl tetrakis [3-(3',5'-di-tert-butyl-4'-hydroxyphenyl)-propanoate]

The compounds are thus seen to be effective process stabilizers in polypropylene compositions containing a phenolic antioxidant.

Summarizing, it is seen that this invention provides various organic materials stabilized against degradation by the presence therein of the indicated hydroxylamine derivatives. Variations may be made in proportions, procedures and materials without departing from the scope of the invention as defined by the following claims.

What is claimed is:

1. A composition of matter comprising a polymer, wax, oil or fat subject to oxidative, thermal and/or actinic degradation stabilized with an effective stabilizing amount of a compound of the formula

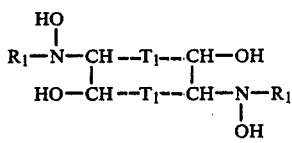

wherein R₁ is alkyl having 1 to 36 carbon atoms, cycloalkyl having 5 to 12 carbon atoms, phenyl or naphthyl which is unsubstituted or substituted by alkyl having 1 to 36 carbon atoms or aralkyl having 7 to 9 carbon atoms which is unsubstituted or substituted by alkyl having 1 to 36 carbon atoms and T₁ represents the carbon atoms necessary to complete a 6- to 12-membered ring.

2. A composition according to claim 1, wherein R₁ is alkyl having 1 to 12 carbon atoms, cycloalkyl having 5 to 8 carbon atoms, phenyl, benzyl or phenylethyl and T, represents the carbon atoms necessary to complete a 6- or 8-membered ring. unsubstituted or substituted by alkyl having 1 to 36 carbon 3. A composition according to claim 2, wherein said compound corresponds to the formula

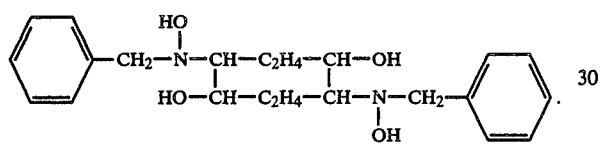

4. The composition of claim 1, wherein the polymer is a synthetic polymer.

5. The composition of claim 4, wherein the synthetic polymer is a polyolefin homopolymer or copolymer.

6. The composition of claim 5 which also contains a phenolic antioxidant.

7. A method for stabilizing a polymer, wax, oil or fat against oxidative, thermal and/or actinic degradation polymer, wax, oil or fat which comprises incorporating into said polymer, wax, oil or fat an effective stabilizing amount of a compound as defined in claim 1.

8. A composition of matter comprising a polymer, wax, oil or fat subject to oxidative, thermal and/or actinic degradation stabilized with an effective stabilizing amount of a compound of the formula

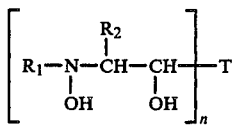

wherein
R₁ is alkyl having 1 to 36 carbon atoms, cycloalkyl having 5 to 12 carbon atoms, phenyl or naphthyl which is unsubstituted or substituted by alkyl having 1 to 36 carbon atoms or aralkyl having 7 to 9 carbon atoms which is unsubstituted or substituted by alkyl having 1 to 36 carbon atoms;
R₂ is hydrogen or R₁;
n is 1 to 14; and
when n is 1, T is R₁ or

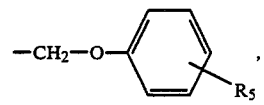

wherein R₅ is hydrogen, halogen, alkyl or alkoxy each having 1 to 4 carbon atoms, hydroxyl, cyano or nitro, or T and R₂ together with the carbon atoms to which they are attached form a ring containing 5 to 12 carbon atoms,
when n is 2, T is alkylene having 2 to 12 carbon atoms or

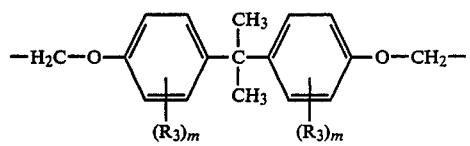

wherein m is 1 or 2 and R₃ is hydrogen, alkyl or alkoxy each having 1 to 4 carbon atoms, hydroxyl, halogen, cyano or nitro, or

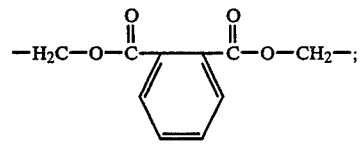

when n is 3, T is

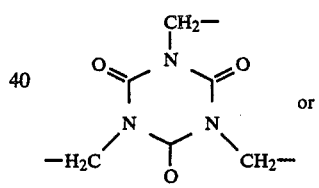

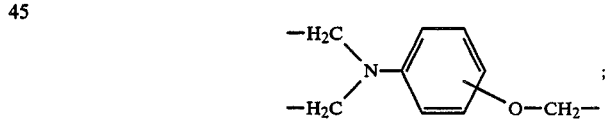

and when n is 4, T is

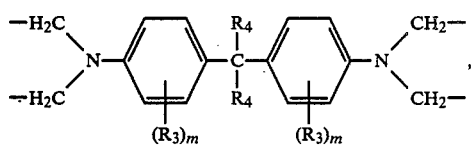

wherein R₄ is hydrogen or methyl and R₃ and m are as previously defined.

9. A composition according to claim 8, wherein R₁ is alkyl having 1 to 18 carbon atoms, cycloalkyl having 5 to 8 carbon atoms, phenyl, benzyl or phenylethyl; R₂ is hydrogen; n is 1 to 4; and, when n is 1, T is R₁ or —CH₂—O—C₆H₅; when n is 2, T is alkylene having 2 to 5 carbon atoms or

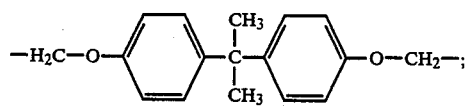

when n is 3, T is

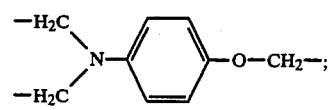

and when n is 4, T is

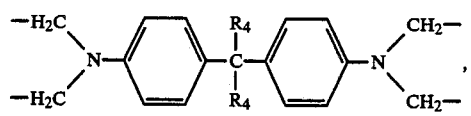

wherein $R_4$ is as defined in claim 8.

10. A composition according to claim 9, wherein $R_1$ is alkyl having 3 to 6 or 8 to 18 carbon atoms, cyclohexyl, cyclooctyl, phenyl or benzyl and n is 1 or 2, and, when n is 1, T is $R_1$ or —$CH_2$—O—$C_6H_5$ and when n is 2, T, is alkylene having 2 or 3 carbon atoms or

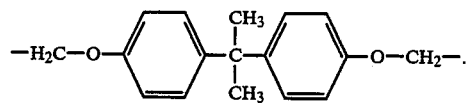

11. A composition according to claim 10, wherein said compound is of the formula

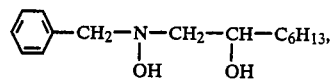

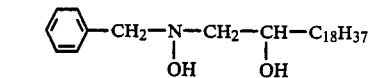

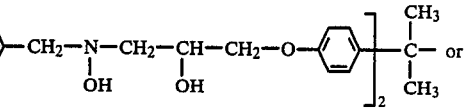

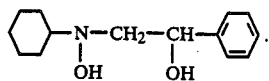

12. The composition of claim 8, wherein the polymer is a synthetic polymer.

13. The composition of claim 12, wherein the synthetic polymer is a polyolefin monopolymer or copolymer.

14. The composition of claim 13 which also contains a metal salt of a higher fatty acid.

15. The composition of claim 8 which also contains a phenolic antioxidant.

16. The composition of claim 14 which also contains a phenolic antioxidant.

17. A method for stabilizing a polymer, wax, oil or fat against oxidative, thermal and/or actinic degradation which comprises incorporating into said polymer, wax, oil, or fat an effective stabilizing amount of a compound as defined in claim 8.

* * * * *